…

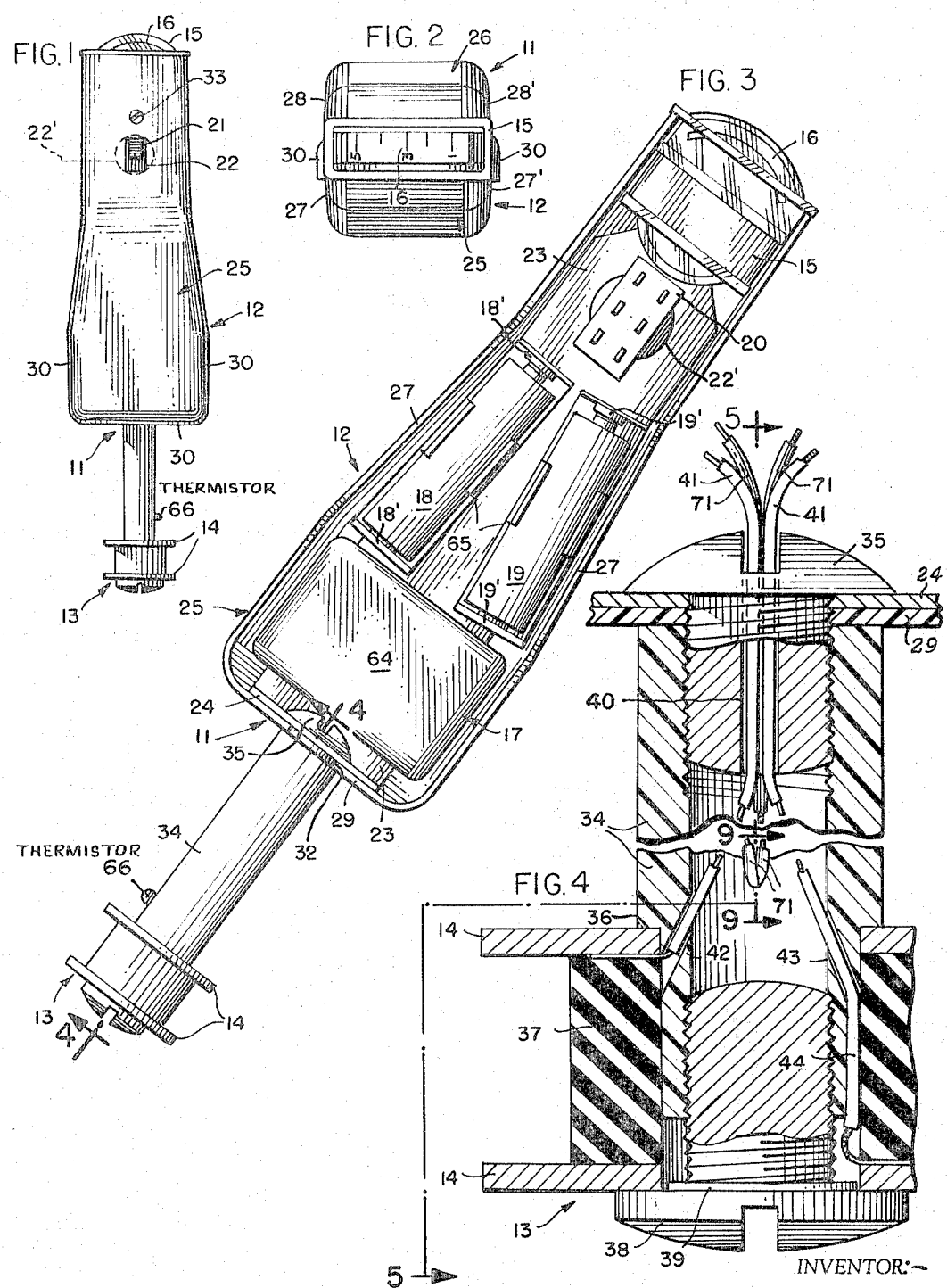

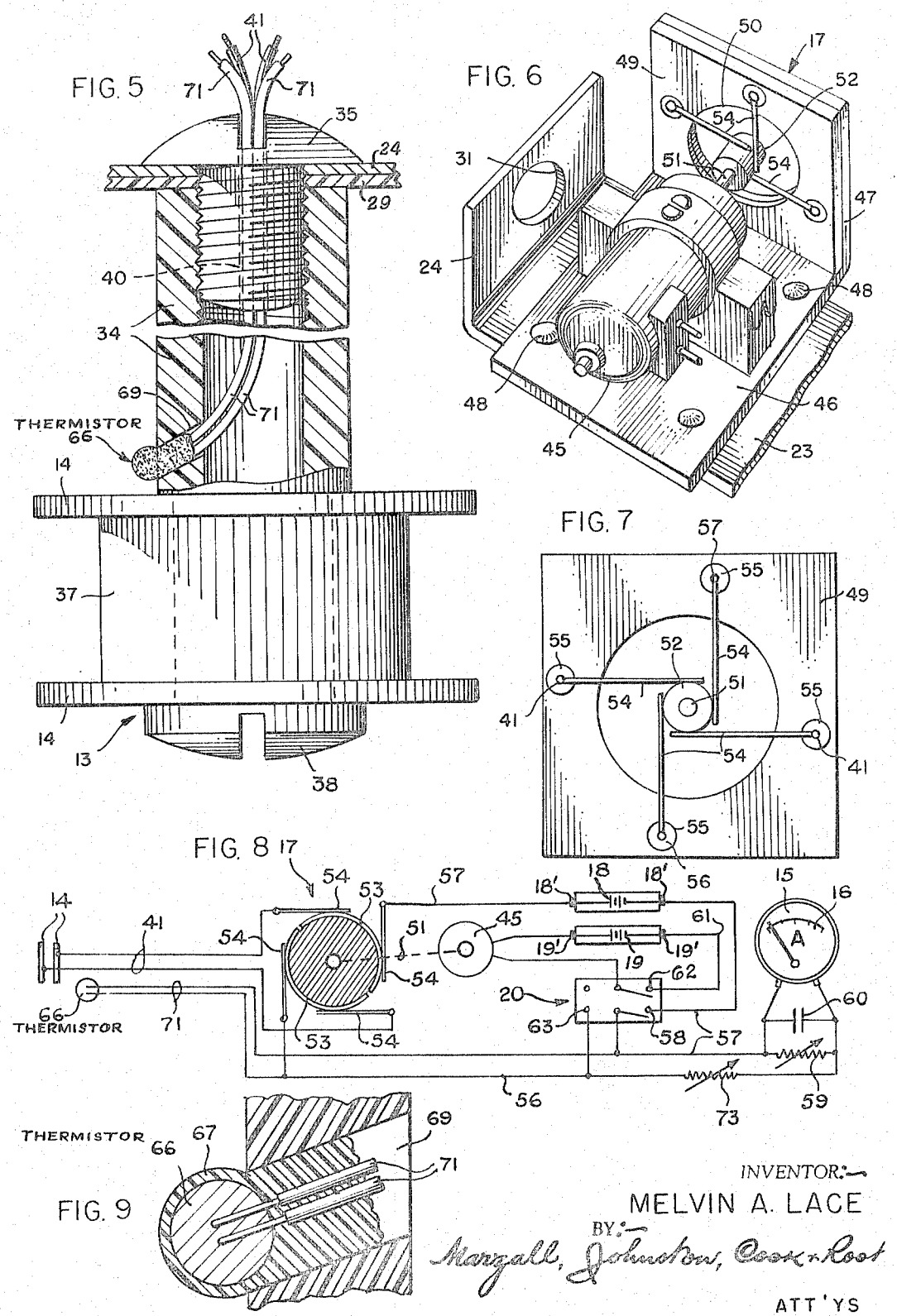

United States Patent Office 3,302,102
Patented Jan. 31, 1967

3,302,102
PORTABLE APPARATUS FOR MEASURING
CONDUCTIVITY OF FLUIDS
Melvin A. Lace, 3 Garden St.,
Prospect Heights, Ill. 60070
Filed Aug. 27, 1962, Ser. No. 219,519
6 Claims. (Cl. 324—30)

The present invention relates in general to a device for measuring the conductivity of liquids, and has more particular reference to a light-weight, portable and self-contained device having a testing probe comprising a pair of spaced electrodes adapted for immersion in liquid, resistance measuring circuitry connected with the probe and a visual indicator calibrated to show the conductivity of the liquid, the invention being particularly well suited for measuring the conductivity of water in terms of the amount of material carried in solution, thereby providing a very useful tool for water treatment engineers and consultants.

An important object of the present invention is to provide a simple, inexpensive and readily portable device for determining the mineral content of water, that is to say, the concentration of material carried in solution therein; a further object being to provide a direct reading meter of the character mentioned that may be carried in the hand of the user and operated instantly to determine the amount of material dissolved in water.

Another important object is to provide a conductivity meter of the character mentioned wherein electrical energy from a suitable source of known potential is applied through liquid and the current flow measured in suitable circuitry including a meter calibrated to determine the conductivity of the liquid in terms of the amount of mineral in solution; a further object being to provide for energizing the meter from a self-contained dry battery of the sort adapted to provide unidirectional electrical energy at a potential of the order of one and one-half volts.

A further important object of the invention is to provide an improved miniature chopper device for interrupting and reversing current flow between the electrodes of the probe through the liquid in which immersed, to thereby inhibit polarization of the probe, that is to say, the formation of hydrogen at an electrode thereof, which decreases the effective area of the electrode and impairs metering accuracy if unidirectional electrical current is permitted to flow continuously through the liquid between the probe electrodes; a still further object being to provide a miniature chopper embodying a small commutator having a pair of segments and driven by a tiny electrical motor energized from a dry battery, the chopper comprising four wires forming wiper blades positioned to ride tangentially on the commutator, the blades being disposed in quadrature, with each blade extending normal with respect to the next adjacent blade, so that adjacent pairs of said wires may be electrically interconnected successively in response to rotation of the commutator, one opposed pair of said wires being connected with the electrodes of the probe, while the other pair is connected in a series circuit including a control switch, an ammeter and a pen-lite dry battery.

Briefly stated, the invention provides a light-weight, manually portable conductivity meter embodying a strip of sheet metal forming a mounting frame having an upstanding flange, at one end, upon which is attached one end of a hollow stem of insulating material in position extending outwardly of the flange, the flange remote end of the stem carrying a pair of spaced apart relatively insulated washers of stainless steel forming the electrodes of an immersion probe. On the side of the flange opposite from the electrode carrying stem, the frame forming sheet metal strip carries a chopper device embodying a tiny electrical motor and a commutator operable to connect four wiper blades successively together in opposite pairs, one pair of such blades being connected respectively with the stainless steel probe electrodes, by means of conductors extending through the electrode carrying stem. On the side of the chopper remote from the probe carrying flange, a pair of pen-lite dry battery mounting clips are secured in side-by-side relationship upon the frame forming strip, which also carries a preferably double-pole double-throw control switch mounted on the strap adjacent the chopper remote ends of the battery clips. The strap mounted components, other than the probe electrode carrying stem, are enclosed in a housing preferably comprising a pair of cooperating shells which may conveniently be formed of high impact, break-resistant styrene. One of the shells is formed to receive, support and enclose the frame forming strap and the strap connected portions of the chopper, the battery clips and the switch, said shell having a notched end wall extending between the flange and the stem of the probe and being clampingly secured therebetween, as by means of a bolt extending through an opening in the flange and having threaded engagement within the flange mounted end of the stem. The other shell serves as a cover for the strap mounted components, and, to that end, may be formed with an end wall notched to snugly fit upon the flange connected end of the probe carrying stem, said cover-forming shell having a peripheral skirt adapted to snugly embrace the sides of the frame carrying shell, means being provided for snappingly securing the shells together in position enclosing the strap and strap mounted components of the meter therebetween. The conductivity measuring device also embodies a low cost ammeter, which may be cemented in place in the probe remote end of the lower casing shell adjacent the switch, in order to expose the indicating dial of the meter at the probe remote end of the housing.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings:

FIG. 1 is a side view of a conductivity meter embodying the present invention;

FIG. 2 is an enlarged view of the indicating meter carrying end of the device shown in FIG. 1;

FIG. 3 is a view of the conductivity meter with cover-forming shell removed to show the arrangement of the several components of the device;

FIG. 4 is an enlarged sectional view taken substantially along line 4—4 in FIG. 3;

FIG. 5 is a sectional view taken substantially along line 5—5 in FIG. 4;

FIG. 6 is a perspective view of a chopping device employed as a component part of the conductivity meter;

FIG. 7 is a plan view of a portion of the chopper device;

FIG. 8 is an electrical circuit diagram; and

FIG. 9 is an enlarged sectional view taken substantially along the line 9—9 in FIG. 4.

To illustrate the invention, FIGS. 1, 2 and 3 of the drawings show a conductivity meter 11 comprising a housing 12, a probe 13 extending outwardly of the housing at one end thereof and embodying a pair of spaced apart and relatively insulated electrodes 14, an indicating ammeter 15 having an indicating dial 16 exposed outwardly of the probe remote end of the housing 12, a chopper device 17 enclosed within the housing 12 together with a pair of pen-lite dry batteries 18 and 19 supported in suitable clips 18', 19', and a preferably double-pole, double-throw switch 20 having a manually operable switch actuating handle or knob 21 exposed outwardly of the housing 12 through an opening 22 therein.

The several components of the conductivity meter, as shown more especially in FIG. 3 of the drawings, are preferably mounted and supported upon a frame comprising a flat strip of sheet metal 23 having an upstanding flange 24 formed at one end thereof. The housing 12 may comprise a pair of cooperating shells 25 and 26 (FIG. 2) respectively having upstanding longitudinal side walls 27 and 28, the shell 25 having an upstanding end wall 29 (FIG. 3) interconnecting the side walls 27 at one end of the shell and the shell 26 having a corresponding end wall interconnecting its side walls 28 at an end thereof. The marginal edges of the side walls 28 and the interconnecting end wall of the shell 26 are provided with outwardly offset edge portions 30 sized and shaped to snugly and interfittingly receive the marginal edges of the side walls 27 and the end wall 29 of the shell 25, so that the shells 25 and 26 when interfitted together may form an enclosing housing for the chopper 17, the batteries 18 and 19, the switch 20 and the meter 15, the shells, at the ends thereof, remote from the upstanding wall 29, forming an opening through which the dial 16 of the meter is exposed.

The shell 25, as shown in FIG. 3 is formed to receive and support the strap 23, including the upstanding flange 24, as well as the strap mounted components 17, 18, 19 and 20, the strap being mounted in the shell 25 with its upstanding portion 24 overlying the inner surface of the end wall 29. The upstanding flange 24 of the strap is formed with a probe mounting opening 31 therethrough, and the end wall 29 of the shell is formed with a notch 32 having a bottom in coaxial alignment with the flange opening 31. The strap 23, at its end remote from the flange 24 may be formed with an opening for receiving the stem of a fastening screw 33 which may also extend through an opening in the shell 25 in order to secure the shell upon the mounting strap, at the end thereof remote from the flange 24.

The probe 13, as shown more particularly in FIGS. 4 and 5, may comprise a tubular mounting stem 34 of plastic or other suitable insulating material, internally threaded at one end to receive the stem of a headed clamp screw or bolt 35 adapted to extend through the flange opening 31 and the notch 32 in order to fasten the stem to the flange 24, and to clamp the flange and stem tightly together upon the wall 29 of the shell, at and around the notch 32, and thereby secure the shell upon the frame 23.

Inwardly of its flange remote end, the mounting stem 34 may be provided with a peripheral shoulder 36 facing toward said flange remote end, said shoulder forming a seat for receiving a preferably stainless steel washer forming one of the electrodes 14. Outwardly of said seat mounted washer, the stem 34 may carry, coaxially mounted thereon, a spacing ring or sleeve 37 of preferably resilient rubber-like insulating material, which preferably extends beyond the flange remote end of the hollow mounting stem 34, said end being preferably threaded internally for engagement with the stem of a headed clamping screw or bolt 38. The clamping screw 38 may be and preferably is formed, between its head and stem, with a circular seat 39 sized to interfit in the central opening of a preferably stainless steel washer constituting the other probe electrode 14, the screw or bolt 38 serving to clampingly secure the electrodes 14 and the resilient spacing sleeve 37 upon the mounting stem 34; and the spacement of the electrodes 14 may be adjusted, in order to calibrate the instrument, by tightening or loosening the screw or bolt 38 in the end of the mounting stem 34, so as to adjust the distance between the washers 14 by adjustably compressing the spacing sleeve 37 therebetween.

In order to electrically connect the electrode forming washers 14 of the probe with the chopper device 17 within the housing 12, the clamping screw or bolt 35 may be formed with an axial channel 40 having opposite ends opening respectively through the head of the bolt and at its head remote end of the stem. A pair of insulated electrical conductors 41 may extend through the channel 40 from within the housing 12 and into the bore of the mounting stem 34. One of the conductors 41 may be threaded through a lateral channel 42 formed in the side wall of the stem 34, adjacent the seat 36, and the bared terminal end of said conductor, stripped of insulation, may be disposed in electrical contact with the seat mounted washer electrode 14, said bared end of the conductor wire being held in electrical contact with the washer by the washer engaging end of the resilient spacing sleeve 37. The other conductor 41 may be threaded through a channel 43 formed through the wall of the hollow mounting stem 34 and thence through a longitudinal groove 44 extending between the outer end of the duct 43 and the flange remote end of the mounting stem 34; and the bared terminal end of the conductor, stripped of insulation, may be held in electrical contact with the electrode forming washer which is supported on the clamping screw or bolt 38, the bared end of the conductor being held in contact with the washer by the washer engaging end of the resilient spacing member 37.

The chopper 17, as shown more particularly in FIGS. 6, 7 and 8, may comprise a miniature direct current motor 45 mounted on a bracket 46 having an upstanding flange 47 extending opposite an end of the motor, the bracket being secured on the frame strip 23 as by means of set screws 48. The flange 47 on its side facing the motor 45 carries a mounting board 49 of insulating material such as bone fiber. The board 49 and the flange on which it is mounted may be formed with an opening 50 therethrough in coaxial alignment with the shaft of the motor. An end of the motor shaft carries a commutator 51 supported coaxially within the opening 50. The commutator may comprise a cylindrical body 52 of insulating material, such as plastic or fiber, carrying a pair of semi-cylindrical commutator plates 53 secured on opposite sides of the body 52, the spacement between the facing edges of the plates 53 being of the order of one one-hundredths of an inch, the diameter of the commutator being of the order of three-sixteenths of an inch. The commutator plates or segments 53 may comprise any suitable or preferred electrical conducting material, including copper, secured in any convenient or preferred manner upon the body 52 of the commutator. The plates 53, however, may conveniently comprise the metal rhodium, gold or silver, which may be electroplated, sprayed, or otherwise applied upon the body 52.

The plate 49 provides an insulating support upon which four commutator wiping blades 54 are mounted, said blades preferably comprising wires of long wearing abrasion-resistant electrical conducting material, such as the precious metal alloy known as Paliney. These blades may be electrically connected with suitable lead wires and secured upon the mounting plate 49, at their conductor connected ends, in any suitable, preferred or convenient manner, as by means of blobs 55 of epoxy resin cement. The blades are preferably mounted in position extending tangentially of the surface of the commutator 51, and have their unsupported ends yieldingly pressed upon the peripheral surface of the commutator, to make wiping electrical contact therewith. The blades are preferably arranged in quadrature, that is to say, each blade extends at right angles with respect to the next adjacent blade.

An opposing pair of blades 54, as shown more particularly in FIG. 8 of the drawings, are connected respectively with the probe connected conductors 41, while the other opposed pair of blades 54 are connected with conductors 56 and 57. Said conductors 56 and 57 in turn are connected with the meter 15 in series with the penlite battery 18 and a normally open contact 58 of the switch 20. As shown, the conductor 56 is connected directly with the meter 15 while the conductor 57 is connected with the meter through the battery 18 and the switch element 58, a variable resistor 59 and a condenser 60 being interconnected in parallel with the meter 15. The resistor serves to calibrate meter sensitivity to obtain full scale deflection at desired current input.

In order to energize the motor 45 to drive the commutator 51, the same, as shown in FIG. 8 of the drawings, is electrically connected in a series circuit 61 which includes the pen-lite battery 19, the motor 45 and another normally open switch contact 62 of the switch 20, resilient means, such as a biasing spring, being provided to hold the contacts 58 and 62 normally in open position so that the same may be closed by manual operation of the handle 21 and may remain closed only so long as the handle 21 is held manually by the operator of the device in switch closing position against the influence of the biasing spring. It will be noted that the switch 20 may conveniently comprise a double-pole, single-throw switching device normally biased to switch open position, but it is preferable to provide a double-pole, double-throw switch including a normally closed switching contact 63 connected with the conductor 56 and adapted to cooperate with the pole of the normally open switch contact 58 so as to short-circuit the meter 15 when the device is not in use.

As shown in FIG. 3 of the drawings, a cover 64 may be provided for enclosing the chopper 17 upon the mounting frame strap 23, within the housing 12. The pen-lite batteries 18 and 19 may be detachably mounted in conventional brackets 65 secured on the mounting strip 23, as by fastening screws or in any other suitable, preferred or conventional fashion. The switching device 20 also may be secured in any preferred or conventional fashion upon the mounting strip 23, at an opening 22' therein, through which opening the operating handle 21 of the switch may extend in position accessible outwardly of the housing 12, through the housing opening 22, shown in FIG. 1. The meter 15 may comprise a low cost unit of the sort provided by Emico, having a controlled full scale voltage characteristic of 0.8 to 1.2 volts; and the meter may be cemented or otherwise secured to the upstanding side walls 27 and to the strap attached wall of the housing component 25, at the probe remote end thereof.

It will be seen from the foregoing that the device of the present invention consists of an alternating current generator, a probe which is capable of being inserted into a solution, and a metering circuit for determining current flow through the solution between the spaced electrodes of the probe. The alternating current generator is a simple battery-driven chopper, the driving motor of which is of the type commonly employed in toys.

The probe is of insulating material carrying a pair of spaced washers of stainless steel for immersion in the solution to be measured. The distance between the washers is variable and allows for easy calibration of the instrument, through compression of the elastic member used as a spacer, by adjustment of the threaded clamp screw 38. Power required for operation of the device is supplied from two self-contained and readily replaceable dry batteries, one of which is employed to actuate the resistance measuring circuit while the other is used to drive the chopper motor, thereby allowing degradation of the motor battery without any effect upon meter readings.

The entire unit is portable and very small and successfully fills a long-felt need for an inexpensive readily portable device for on-the-spot analysis of the chemical content of solutions as for instance the water employed in cooling towers and wherever else rapid checking of aqueous solutions is desired.

It is contemplated that devices made in accordance with the present invention shall be housed in a high impact, break resistance styrene casing, and shall have measurements of the order of nine inches in length, two inches in width, an inch and one-half in thickness and weight of the order of five ounces.

In order to provide for automatic adjustment of the metering system to compensate for variation in temperature of the liquid in which the device may be used, a thermistor 66 sealed in epoxy resin cement 67 may be mounted in the outer end of a duct 69 formed through the walls of the probe system 34, the outer thermistor mounting end of the duct being positioned close to one of the probe electrodes 14. The thermistor 66 may comprise a wafer or lump of thermistor material containing the ends of conductors 71 embedded therein and thus electrically connected thereto. The conductors may extend from the thermistor, through the duct 69, the hollow stem 34, the axial channel 40 of the probe mounting clamp screw and, thence, into the housing for connection across the meter 15 in series with an adjustable resistor 73 for calibrating the meter to compensate for variation from optimum value in the resistance characteristics of the thermistor.

Where the power sources 18 and 19 are conventional 1.5 volt batteries, and the thermistor provides a resistance of the order of 50 ohms at normal room temperatures (70° F.), the adjustable calibrating resistors 59 and 73 may provide resistance ranges of 68–180 and 6.2–27 ohms, respectively.

It is thought that the invention and its numerous attendant advantages will be fully understood from the foregoing description, and it is obvious that numerous changes may be made in the form, construction, and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A manually portable device for testing the conductivity of fluids comprising an elongated strip of material forming a support frame having an upstanding flange at one end, a meter having an indicating dial supported at the flange remote end of said strip, an elongated stem forming a probe secured, at one end, on said flange and extending outwardly of the meter remote end of the frame, said probe embodying a pair of spaced, relatively insulated electrodes secured on said stem, at its flange remote end, in position for immersion in a fluid to be tested, means forming a measuring circuit interconnecting said electrodes with said meter in a series circuit including a rotary reversing switch, a manually operable circuit control switch and terminal clips for detachably supporting a direct current electric battery, on said frame, and connecting it in said measuring circuit, said reversing and control switches and said terminal clips being mounted on said frame, between the meter and said probe carrying flange, an electric motor mounted on the support frame adjacent and drivingly connected with said reversing switch, means forming a motor energizing circuit connected with said motor and comprising a manually operable motor control switch and terminal contacts for detachably supporting a direct current electric battery on said frame and for connecting it in said energizing circuit, said circuit and motor control switches being mechanically interconnected for operation in unison to activate and to disable the measuring and energizing circuits.

2. A manually portable device, as set forth in claim 1, including an auxiliary switch connected across the meter to short circuit the same when the auxiliary switch is closed, said auxiliary switch being mechanically interlocked with said disabling and control switches to short circuit the meter when the measuring and motor energizing circuits are inactive.

3. A manually portable device, as set forth in claim 1, including a pair of cooperating shells of molded plastic insulating material secured on said frame in position forming a housing enclosing the frame and said frame mounted switches, motor, battery terminal clips and contacts and meter, said housing having an opening exposing the indicating dial of the meter to view at the end of the frame remote from the probe.

4. A manually portable device, as set forth in claim 3 wherein said cooperating shells include a lower shell covering the underside of the support frame and having an upstanding peripheral edge extending upwardly of the frame forming strip in position enclosing the opposite sides of the rotary reversing and manually operable control switches, the battery mounting terminal clips and contacts, the motor and the meter, as well as the upstanding flange of the support frame, a clamp screw securing the stem of the probe on said flange in position overlying and clamping a portion of the marginal edge of said shell to said flange, to hold the shell in mounted position thereon and means for securing the flange remote end of the said shell on said support frame.

5. A manually portable device, as set forth in claim 1, wherein the stem of the probe comprises a tube of electrical insulating material, a headed fastening member having a duct opening at the opposite ends, said member extending through an opening in the flange and being secured to the flange connected end of the tube to clamp the stem on the flange, conductors connected with said electrodes and extending through the stem and said duct for connection in said measuring circuit on the stem remote side of the flange.

6. A manually portable device, as set forth in claim 1, wherein the stem comprises electrical insulating material formed with a peripheral shoulder disposed inwardly of and facing the flange remote end of the stem, said electrodes comprising washers of electrical conducting material of which one is in seating engagement with said shoulder, a spacing collar of resilient insulating material seated, at one end, on said shoulder engaging washer, the other washer being seated upon the other end of the collar, and a headed screw extending through said other washer and said collar and having axially adjustable engagement in the flange remote end of the stem to secure the washers and spacing collar thereon and to adjust the spacement of said collars by axial adjustment of the screw on the stem.

References Cited by the Examiner
UNITED STATES PATENTS

| | | | |
|---|---|---|---|
| 1,346,057 | 7/1920 | Reardon | 324—30 |
| 1,616,387 | 2/1927 | Perry | 324—30 X |
| 2,204,196 | 6/1940 | Straatman | 324—30 X |
| 2,328,853 | 9/1943 | Sharrard | 324—65 |
| 2,388,141 | 10/1945 | Harrington | 324—30 X |
| 2,597,088 | 5/1952 | Dutilh | 324—62 X |
| 2,680,834 | 6/1954 | Burns et al. | 324—72.5 X |
| 2,793,527 | 5/1957 | Turner et al. | |
| 2,922,105 | 1/1960 | Estelle | 324—30 |

WALTER L. CARLSON, *Primary Examiner.*

FREDERICK M. STRADER, *Examiner.*

RUDOLPH V. ROLINEC, C. F. ROBERTS,
*Assistant Examiners.*